US012309041B2

United States Patent
Phalak et al.

(10) Patent No.: US 12,309,041 B2
(45) Date of Patent: May 20, 2025

(54) SERVICE-LEVEL OBJECTIVE (SLO) AWARE EXECUTION OF CONCURRENCE INFERENCE REQUESTS ON A FOG-CLOUD NETWORK

(71) Applicant: Tata Consultancy Services Limited, Mumbai (IN)

(72) Inventors: Chetan Dnyandeo Phalak, Mumbai (IN); Dheeraj Chahal, Pune (IN); Rekha Singhal, Thane West (IN)

(73) Assignee: Tata Consultancy Services Limited, Mumbai (IN)

( * ) Notice: Subject to any disclaimer, the term of this patent is extended or adjusted under 35 U.S.C. 154(b) by 11 days.

(21) Appl. No.: 18/393,130

(22) Filed: Dec. 21, 2023

(65) Prior Publication Data

US 2024/0235961 A1    Jul. 11, 2024

(30) Foreign Application Priority Data

Jan. 5, 2023    (IN) .............................. 202321001226

(51) Int. Cl.
 G06F 15/173    (2006.01)
 G06F 9/50    (2006.01)
 H04L 41/5009    (2022.01)

(52) U.S. Cl.
 CPC ........ H04L 41/5009 (2013.01); G06F 9/5072 (2013.01)

(58) Field of Classification Search
 CPC .......................... H04L 41/5009; G06F 9/5072

(Continued)

(56) References Cited

U.S. PATENT DOCUMENTS 7,712,102 B2 * 5/2010 Herington ............. G06F 9/5083
 709/201
7,752,623 B1 * 7/2010 Crawford, Jr. ........ G06F 9/5077
 718/1

(Continued)

OTHER PUBLICATIONS

Zhang, Chengliang et al., "Enabling Cost-Effective, SLO-Aware Machine Learning Inference Serving on Public Cloud", Title of the item: IEEE Transactions on Cloud Computing, Date: 2020, Publisher: IEEE, Link: https:/par.nsf.gov/servlets/purl/10166780.

(Continued)

*Primary Examiner* — Alicia Baturay
(74) *Attorney, Agent, or Firm* — Finnegan, Henderson, Farabow, Garrett & Dunner, LLP (57) ABSTRACT

Cloud and Fog computing are complementary technologies used for complex Internet of Things (IoT) based deployment of applications. With an increase in the number of internet-connected devices, the volume of data generated and processed at higher speeds has increased substantially. Serving a large amount of data and workloads for predictive decisions in real-time using fog computing without Service-Level Objective (SLO) violation is a challenge. Present disclosure provides systems and method for inference management wherein a suitable execution workflow is automatically generated to execute machine learning (ML)/deep learning (DL) inference requests using fog with various type of instances (e.g., Function-as-a-Service (FaaS) instance, Machine Learning-as-a-service (MLaaS) instance, and the like) provided by cloud vendors/platforms. Generated workflow minimizes the cost of deployment as well as SLO violations.

20 Claims, 6 Drawing Sheets (58) Field of Classification Search
USPC .......................................................... 709/224
See application file for complete search history.

(56) References Cited

U.S. PATENT DOCUMENTS

| | | | | |
|---|---|---|---|---|
| 7,925,921 | B2* | 4/2011 | Qutub | H04L 41/0654 |
| | | | | 714/13 |
| 9,323,583 | B2* | 4/2016 | Guillou | G06F 9/5083 |
| 9,563,473 | B2* | 2/2017 | Ghosh | G06F 9/4887 |
| 10,198,291 | B2* | 2/2019 | Boehm | G06F 9/5066 |
| 10,600,089 | B2* | 3/2020 | Fichter | G06F 16/954 |
| 11,075,934 | B1* | 7/2021 | Aldhaheri | G06N 3/048 |
| 11,281,499 | B2* | 3/2022 | Bartfai-Walcott | G06F 9/5083 |
| 11,295,131 | B1* | 4/2022 | Dhawan | G08G 5/80 |
| 11,444,338 | B1* | 9/2022 | Dhawan | H01M 50/569 |
| 11,449,777 | B1* | 9/2022 | Sathe | G06F 9/45558 |
| 11,461,300 | B2* | 10/2022 | Adibowo | G06F 16/2255 |
| 11,562,263 | B2* | 1/2023 | Cheng | G06N 5/04 |
| 11,599,821 | B2* | 3/2023 | Sengupta | G06F 9/5022 |
| 11,605,028 | B2* | 3/2023 | Gazzetti | G06N 5/04 |
| 11,616,259 | B1* | 3/2023 | Dhawan | H01M 10/4257 |
| | | | | 320/109 |
| 11,663,047 | B2* | 5/2023 | Bartfai-Walcott | H04L 67/10 |
| | | | | 709/223 |
| 11,714,681 | B2* | 8/2023 | Yang | G06F 9/5027 |
| | | | | 718/104 |
| 11,829,849 | B2* | 11/2023 | Byers | G06F 11/3024 |
| 11,960,935 | B2* | 4/2024 | Sengupta | G06F 9/4856 |
| 12,051,099 | B2* | 7/2024 | Malhotra | G06N 3/09 |
| 12,073,606 | B1* | 8/2024 | Ward | G06V 10/774 |
| 12,141,620 | B2* | 11/2024 | Bartfai-Walcott | H04L 67/10 |
| 12,175,520 | B2* | 12/2024 | Gupta | G06N 3/045 |
| 12,197,958 | B2* | 1/2025 | Dhandhania | G06N 20/00 |
| 2022/0067527 | A1* | 3/2022 | Xu | G06N 3/048 |
| 2022/0383149 | A1* | 12/2022 | Cao | G06N 5/04 |
| 2023/0267344 | A1* | 8/2023 | Chang | G06F 8/60 |
| | | | | 706/46 |
| 2024/0185098 | A1* | 6/2024 | Kou | G06F 9/5027 |
| 2025/0036477 | A1* | 1/2025 | Bartfai-Walcott | G06F 9/5083 |

OTHER PUBLICATIONS

Mampage, Anupama et al., "A Holistic View on Resource Management in Serverless Computing", Environments: Taxonomy and Future Directions, Date: 2021, Publisher: arxiv, Link: https://arxiv.org/pdf/2105.11692.pdf.

Fang, Wei et al., "RPPS: A Novel Resource Prediction and Provisioning Scheme in Cloud Data Center", Title of the item: IEEE Ninth International Conference on Services Computing, Date: 2012, Publisher: IEEE.

* cited by examiner

SERVICE-LEVEL OBJECTIVE (SLO) AWARE EXECUTION OF CONCURRENCE INFERENCE REQUESTS ON A FOG-CLOUD NETWORK

PRIORITY CLAIM

This U.S. patent application claims priority under 35 U.S.C. § 119 to: Indian Patent Application No. 202321001226, filed on Jan. 5, 2023. The entire contents of the aforementioned application are incorporated herein by reference.

TECHNICAL FIELD

The disclosure herein generally relates to concurrent inference requests management, and, more particularly, to service-level objective (SLO) aware execution of concurrence inference requests on a fog-cloud network.

BACKGROUND

Cloud and Fog computing are complementary technologies used for complex Internet of Things (IoT) based deployment of applications. With an increase in the number of internet-connected devices, the volume of data generated and processed at higher speeds has increased substantially. Serving a large amount of data and workloads for predictive decisions in real-time using fog computing without Service-Level Objective (SLO) violation is a challenge.

SUMMARY

Embodiments of the present disclosure present technological improvements as solutions to one or more of the above-mentioned technical problems recognized by the inventors in conventional systems.

For example, in one aspect, there is provided a processor implemented method for service-level objective (SLO) aware execution of concurrence inference requests on a fog-cloud network. The method comprises receiving, by a load manager (LM) via one or more hardware processors, a plurality of concurrent inference requests from a first set of devices; determining, by the LM via the one or more hardware processors, a maximum concurrency inference request that one or more devices from a second set of devices are capable of handling based on a pre-defined parameter, and the plurality of concurrent inference requests, using a regression model; performing, via the one or more hardware processors, a first comparison of (i) the plurality of concurrent inference requests, and (ii) the maximum concurrency inference request; determining, via the one or more hardware processors, number of concurrent inference requests amongst the plurality of concurrent inference requests that are not handled by the one or more devices from the second set of devices based on the first comparison; routing, by the load manager via the one or more hardware processors, the number of concurrent inference requests amongst the plurality of concurrent inference requests to a cloud resource predictor (CRP), and subsequently from the CRP to one or more first type of instances; calculating, by the CRP via the one or more hardware processors, number of second type instances for handling the determined number of concurrent inference requests with the pre-defined parameter; initiating, by a Cloud Resource Manager (CRM) via the one or more hardware processors, one or more second type instances based on the calculated number of second type instances and verifying an associated initial status; routing, by the CRM via the one or more hardware processors, one or more concurrent inference requests from the number of concurrent inference requests that are currently being executed on the one or more first type of instances to the one or more second type instances based on the associated initial status of the one or more second type instances; and periodically monitoring, by the CRM via the one or more hardware processors, a status of the one or more concurrent inference requests being executed by the one or more second type instances.

In an embodiment, the method further comprises turning OFF, by the CRM via the one or more hardware processors, at least a subset of the one or more second type instances based on a second comparison of an associated idle time with a pre-defined time.

In an embodiment, the first set of devices comprises one or more edge devices, and the second set of devices comprises one or more fog devices.

In an embodiment, when the plurality of concurrent inference requests is greater than the maximum concurrency inference request, the one or more concurrent inference requests are routed to at least one of the one or more first type of instances and the one or more second type of instances.

In an embodiment, the one or more first type of instances comprise a Function as a Service (FaaS) instance.

In an embodiment, the one or more second type instances comprise a Machine Learning as a Service (MLaaS) instance.

In an embodiment, the one or more first type instances and the one or more second type instances are run on a cloud network.

In another aspect, there is provided a processor implemented system for service-level objective (SLO) aware execution of concurrence inference requests on a fog-cloud network. The system comprises: a memory storing instructions; one or more communication interfaces; and one or more hardware processors coupled to the memory via the one or more communication interfaces, wherein the one or more hardware processors are configured by the instructions to: receive, by using a load manager (LM), a plurality of concurrent inference requests from a first set of devices; determine, by using the LM, a maximum concurrency inference request that one or more devices from a second set of devices are capable of handling based on a pre-defined parameter, and the plurality of concurrent inference requests, using a regression model; perform a first comparison of (i) the plurality of concurrent inference requests, and (ii) the maximum concurrency inference request; determine number of concurrent inference requests amongst the plurality of concurrent inference requests that are not handled by the one or more devices from the second set of devices based on the first comparison; route, by using the LM, the number of concurrent inference requests amongst the plurality of concurrent inference requests to a cloud resource predictor (CRP), and subsequently from the CRP to one or more first type of instances; calculate, by using the CRP, number of second type instances for handling the determined number of concurrent inference requests with the pre-defined parameter; initiate, by a Cloud Resource Manager (CRM), one or more second type instances based on the calculated number of second type instances and verify an associated initial status; route, by using the CRM, one or more concurrent inference requests from the number of concurrent inference requests that are currently being executed on the one or more first type of instances to the one or more second type instances based on the associated initial status of the one or more second type instances; and periodically monitor, by using the CRM, a status of the one or more concurrent inference requests being executed by the one or more second type instances.

In an embodiment, the one or more hardware processors are further configured by the instructions to turn OFF, by using the CRM, at least a subset of the one or more second type instances based on a second comparison of an associated idle time with a pre-defined time.

In an embodiment, the first set of devices comprises one or more edge devices, and the second set of devices comprises one or more fog devices.

In an embodiment, when the plurality of concurrent inference requests is greater than the maximum concurrency inference request, the one or more concurrent inference requests are routed to at least one of the one or more first type of instances and the one or more second type of instances.

In an embodiment, the one or more first type of instances comprise a Function as a Service (FaaS) instance.

In an embodiment, the one or more second type instances comprise a Machine Learning as a Service (MLaaS) instance.

In an embodiment, the one or more first type instances and the one or more second type instances are run on a cloud network.

In yet another aspect, there are provided one or more non-transitory machine-readable information storage mediums comprising one or more instructions which when executed by one or more hardware processors cause service-level objective (SLO) aware execution of concurrence inference requests on a fog-cloud network by receiving, by a load manager (LM), a plurality of concurrent inference requests from a first set of devices; determining, by the LM, a maximum concurrency inference request that one or more devices from a second set of devices are capable of handling based on a pre-defined parameter, and the plurality of concurrent inference requests, using a regression model; performing a first comparison of (i) the plurality of concurrent inference requests, and (ii) the maximum concurrency inference request; determining number of concurrent inference requests amongst the plurality of concurrent inference requests that are not handled by the one or more devices from the second set of devices based on the first comparison; routing, by the load manager, the number of concurrent inference requests amongst the plurality of concurrent inference requests to a cloud resource predictor (CRP), and subsequently from the CRP to one or more first type of instances; calculating, by the CRP, number of second type instances for handling the determined number of concurrent inference requests with the pre-defined parameter; initiating, by a Cloud Resource Manager (CRM), one or more second type instances based on the calculated number of second type instances and verifying an associated initial status; routing, by the CRM, one or more concurrent inference requests from the number of concurrent inference requests that are currently being executed on the one or more first type of instances to the one or more second type instances based on the associated initial status of the one or more second type instances; and periodically monitoring, by the CRM, a status of the one or more concurrent inference requests being executed by the one or more second type instances.

In an embodiment, the one or more instructions which when executed by one or more hardware processors further cause turning OFF, by the CRM via the one or more hardware processors, at least a subset of the one or more second type instances based on a second comparison of an associated idle time with a pre-defined time.

In an embodiment, the first set of devices comprises one or more edge devices, and the second set of devices comprises one or more fog devices.

In an embodiment, when the plurality of concurrent inference requests is greater than the maximum concurrency inference request, the one or more concurrent inference requests are routed to at least one of the one or more first type of instances and the one or more second type of instances.

In an embodiment, the one or more first type of instances comprise a Function as a Service (FaaS) instance.

In an embodiment, the one or more second type instances comprise a Machine Learning as a Service (MLaaS) instance.

In an embodiment, the one or more first type instances and the one or more second type instances are run on a cloud network.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

In the year 2022, there were approximately 42 billion IoT devices worldwide and this number is expected to exceed 75 billion by 2025 (e.g., refer "https://papers.ssrn.com/sol3/papers.cfm?abstract_id=3619450"). The Internet of Things (IoT) has transformed the way businesses work, and the industry has seen a massive shift from on-premises software to cloud computing. IoT has spread throughout many industries, serving consumers on a worldwide scale. Brands are extending their service offerings and experimenting with various concepts to improve the client experience, from smart voice assistants to smart homes. Today, massive amounts of customer activity data is gathered via a variety of cutting-edge IoT devices. ML/DL models are using this data to predict the demands of the consumer. Cloud computing is another element that helps the IoT succeed along with machine learning. Cloud computing allows users to complete computing tasks by utilizing Internet-based services. IoT, ML/DL, and fog-cloud computing have all become indispensable components of modern life, especially in the management of information.

Fog computing was introduced after cloud computing by placing resources close to edge devices. Although it improves latency, its drawbacks must not be overlooked. Due to their limited processing and storage capabilities, fog devices benefit from the integration with cloud computing. However, maintenance in fog architecture is not as seamless as it is in cloud architecture. Additional maintenance is required because controllers and storage are dispersed throughout the network. In a fog environment, the number of fog nodes and their energy consumption is directly proportional. This indicates that a larger quantity of energy is needed for a higher number of fog nodes to operate. The fog devices must always be available to handle any unforeseen input load. However, the fog system's horizontal scaling is not dynamic in response to the incoming load. The fog devices must always be available to handle any unforeseen input load. Cloud is a panacea to address the challenges of maintenance, power consumption, and scalability faced in fog computing.

Cloud providers like Amazon®, Google®, and Microsoft® offer a variety of options for service provisioning, ranging from virtual machines to the burgeoning serverless functions such as Infrastructure-as-a-Service (IaaS), Machine Learning-as-a-Service (MLaaS), and Function-as-a-Service (FaaS). All these services can be used in isolation or in conjunction to serve machine learning (ML)/deep learning (DL) inference systems for IoT applications. To determine the most appropriate service, the best metrics for comparison are cost and latency. Several IaaS services like EC2 (e.g., "Amazon EC2," https://aws.amazon.com/ec2/, 2022), Google Compute Engine (e.g., "Compute Engine, https://cloud.google.com/compute, 2022"), and Azure VM (e.g., refer ""Microsoft Virtual Machines," https://azure.microsoft.com/enin/services/virtual-machines/, 2022") are cost-efficient alternatives on the cloud front, but there is a limitation on latency provided by them. MLaaS services like SageMaker (e.g., ""Amazon SageMaker," https://aws.amazon.com/sagemaker/, 2022"), AutoML (e.g., ""Auto ML," https://cloud.google.com/automl, 2022") and Azure ML (e.g., ""Azure Machine Learning," https://azure.microsoft.com/enin/services/machine-learning/, 2022") is comparatively costlier than IaaS, but very well designed to serve ML/DL model's training and inference. MLaaS comes with pre-built multiple optimized frameworks for automatic deployment of ML/DL workloads. In contrast to IaaS, MLaaS allows for the spawning of as many instances as necessary after the model configuration is complete. However, one of the challenges with MLaaS is that it takes longer to boot a new instance (a few minutes) which causes high latency and SLO violations during this period. One solution is to use a highly scalable serverless FaaS platform that boots up in a few seconds resulting in a smaller cold start. Based on the advantages and disadvantages outlined above, a fusion of FaaS with MLaaS can be a good option for meeting SLOs and providing cost-effective ML/DL inference requests.

In the present disclosure, the system and method described herein extend the fog environment using FaaS and MLaaS platforms on a public cloud and implement a scalable SLO-aware and cost-efficient system for inference request management (SIRM).

SLO and cost have been taken into account simultaneously in several research studies in the past to support inference systems. Mark (Model Ark) (e.g., refer "C. Zhang, M. Yu, W. Wang, and F. Yan, "Cost efficient and SLO aware Real-Time ML prediction on Fog-Cloud Network," IEEE Transactions on Cloud Computing, July 2020.") is a general-purpose inference serving system, designed to address the challenges of cost-effectiveness and SLO compliance. MArk reduces the serving cost up to 7.8× while achieving better latency performance. Spock (e.g., refer "J. R. Gunasekaran, P. Thinakaran, M. T. Kandemir, B. Urgaonkar, G. Kesidis and C. R. Das, "Spock: Exploiting Serverless Functions for SLO and Cost Aware Resource Procurement in Public Cloud," 12th International Conference on Cloud Computing, pp. 199-208, August 2019.") is a scalable and elastic control system that exploits both VMs and serverless functions to reduce cost and ensure SLOs for elastic web services. Spock reduces SLO violations of queries by up to 74% and achieved cost savings by up to 33% compared to traditional approaches using VMs only. LIBRA (e.g., refer "A. Raza, Z. Zhang, N. Akhtar, V. Isahagian and I. Matta," LIBRA: An Economical Hybrid Approach for Cloud Applications with Strict SLAs," 2021 IEEE International Conference on Cloud Engineering (IC2E), 2021, pp. 136-146, doi: 10.1109/IC2E52221.2021.00028.") simultaneously uses both IaaS and FaaS cloud services to cater to the dynamic demand of applications and achieves more than 85% reduction in SLO violations and up to 53% cost savings. Splice (e.g., refer "M. Son, S. Mohanty, J. R. Gunasekaran, A. Jain, M. T. Kandemir, G. Kesidis and B. Urgaonkar, "Splice: An Automated Framework for Costand Performance-Aware Blending of Cloud Services," 2022 22nd IEEE International Symposium on Cluster, Cloud and Internet Computing (CCGrid), 2022, pp. 119-128, doi: 10.1109/CCGrid54584.2022.00021.") is a framework for cost and a performance-aware blending of IaaS and FaaS services that claim a reduction in SLO violations and cost by 31% and 32% respectively.

JellyBean (e.g., refer "Y. Wu, M. Lentz, D. Zhuo, and Y. Lu, "Serving and Optimizing Machine Learning Workflows on Heterogeneous Infrastructures," arXiv e-prints, May 2022."), is a framework for serving and optimizing machine learning inference workflows on heterogeneous infrastructure. JellyBean also outperforms prior ML serving systems (e.g., Spark on the cloud) by up to 5× in serving costs. Another research work, RIBBON (e.g., refer "Ribbon: Cost-Effective and QoS-Aware Deep Learning Model Inference using a Diverse Pool of Cloud Computing Instances"), finds the most optimal instance configuration to jointly optimize two competing goals: meeting the QoS and minimizing cost. Ribbon uses a BO-based exploration exploitation approach for finding the optimal instance configuration. Evaluation of RIBBON confirms that it can yield up to 16% cost savings. InferALL (e.g., refer "P. Kumar, "Inferall: coordinated optimization for machine learning inference serving in public cloud,", Computer Science and Engineering, PennState University Libraries, March 2021.") is a python-based simulator that jointly exploits heterogeneity in models, request-batching, compute resources, and cloud offerings to provide a cost-efficient and SLO-aware inference serving system. InferALL claims that it reduces costs up to 95% (depending upon SLO) while satisfying the 99th percentile tail latency within SLO limits when compared to state-of-art inference serving systems. Jily (e.g., refer "Z. Wang, X. Tang, Q. Liu and J. Han, "Jily: Cost-Aware AutoScaling of Heterogeneous GPU for DNN Inference in Public Cloud," IEEE 38th International Performance Computing and Communications Conference (IPCCC), 2019, pp. 1-8, doi: 10.1109/IPCCC47392.2019.8958770, October 2019.") is an auto-scaling scheduler for Deep Neural Network (DNN) inference services to minimize the cost while satisfying the given latency SLO. Jily finds the optimal heterogeneous GPU instance provisioning through a DNN inference model profiler, latency estimator, workload predictor, and a cost-aware scaler. Simulation results demonstrate that Jily can reduce the average cost by up to 28% compared to a state-of-the-art auto-scaling approach.

Another set of publications creates SLO and cost-aware system by employing batching and buffering. MLProxy (e.g., refer "N. Mahmoudi and H. Khazaei, "MLProxy: SLA-Aware Reverse Proxy for Machine Learning Inference Serving on Serverless Computing Platforms," arXiv-CS-Artificial Intelligence, pp. 1-1, February 2022."), is an adaptive reverse proxy that employs adaptive batching to support efficient machine learning serving workloads on serverless computing systems. BATCH (e.g., refer "A. Ali, R. Pinciroli, F. Yan and E. Smirni, "BATCH: Machine Learning Inference Serving on Serverless Platforms with Adaptive Batching," SC20: International Conference for High Performance Computing, Networking, Storage and Analysis, 2020, pp. 1-15, doi: 10.1109/SC41405.2020.00073.") is a framework for supporting efficient machine learning serving on serverless platforms. Their evaluation verifies the accuracy of the analytic optimizer and demonstrates performance and cost advantages over the state-of-the-art method MArk and the state-of-the-practice tool SageMaker.

In MLaaS based deployments for inference, users submit their query using several edge devices such as mobile phones. The user's inference request is sent to an application programming interface (API) Gateway, which directs it to the intended SageMaker instance endpoint. SageMaker endpoint is a fully managed service that allows making real-time inferences via a REST API. Model for inference is automatically loaded from the object storage such as S3 or the user specified path when endpoint creation request is invoked. Since each model has a unique endpoint, an inference request is sent to the specific model that is hosted by SageMaker. SageMaker executes the inference request, and the output is pushed to the user over the same connection.

In FaaS based deployment, user's inference request is sent to the Lambda function-specific API Gateway. The first invocation results in a cold start of a few seconds due to time spent in creating the execution environment and loading the model from a storage service such as S3. Once invoked, function remains warm for 15 minutes and subsequent requests are executed with very low latency. Every user request is registered as an event resulting in the invocation of a new function. Functions are scaled-up and scaled-down dynamically based on the incoming workload. User requests are served in parallel using unique functions resulting in high scalability and low latency.

Embodiments of the present disclosure overcome the above technical problems and addresses these by providing a system and method for inference request management wherein numerous edge devices that serve as a source of inference requests. The system of the present disclosure collects all incoming concurrent inference requests. The resource for executing the request is derived here, and requests are navigated to the selected resource (fog, serverless function (FaaS, or ML platform/MLaaS). The requests are executed on a specific resource and the output is sent back to the system, which eventually reaches the proper edge device that raised the inference request.

Referring now to the drawings, and more particularly to FIGS. 1 through 8, where similar reference characters denote corresponding features consistently throughout the figures, there are shown preferred embodiments and these embodiments are described in the context of the following exemplary system and/or method.

Figure 1:
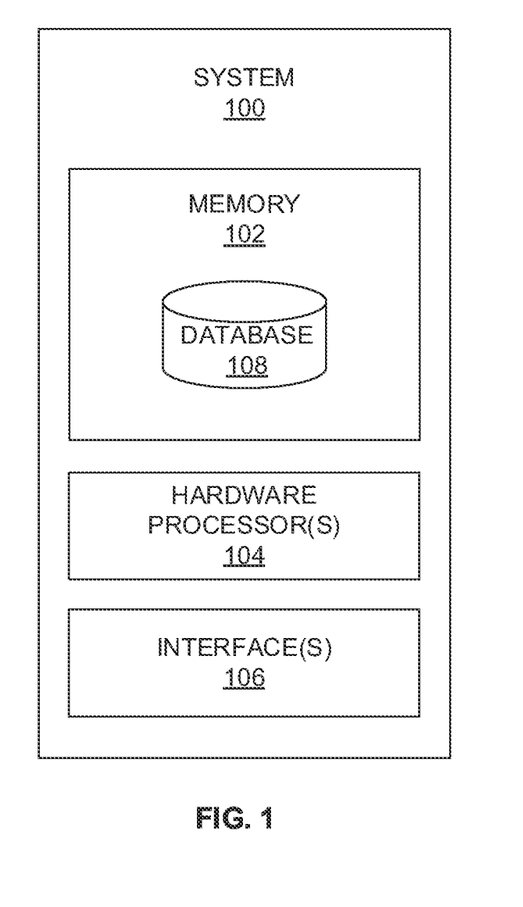
FIG. 1 depicts an exemplary system for service-level objective (SLO) aware execution of concurrence inference requests on a fog-cloud network, in accordance with an embodiment of the present disclosure.

FIG. 1 depicts an exemplary system 100 for service-level objective (SLO) aware execution of concurrence inference requests on a fog-cloud network, in accordance with an embodiment of the present disclosure. The system 100 may also be referred as "System for Inference Management System (SIRM)", and interchangeably used herein. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information pertaining to a first set of devices, a second set of devices that are different from the first set of devices, one or more concurrency inference requests, a pre-defined parameter (e.g., tolerant service-level objective (SLO)), a maximum concurrency inference request. The database 108 further comprises information pertaining to concurrency inference request that are being executed by the second set of devices or by either one or more first type of instance(s), and one or more second type instances, one or more statuses associated with the one or more first type of instance(s), and the one or more second type instances, and the like. The memory 102 further comprises one or more regression models as known in the art. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
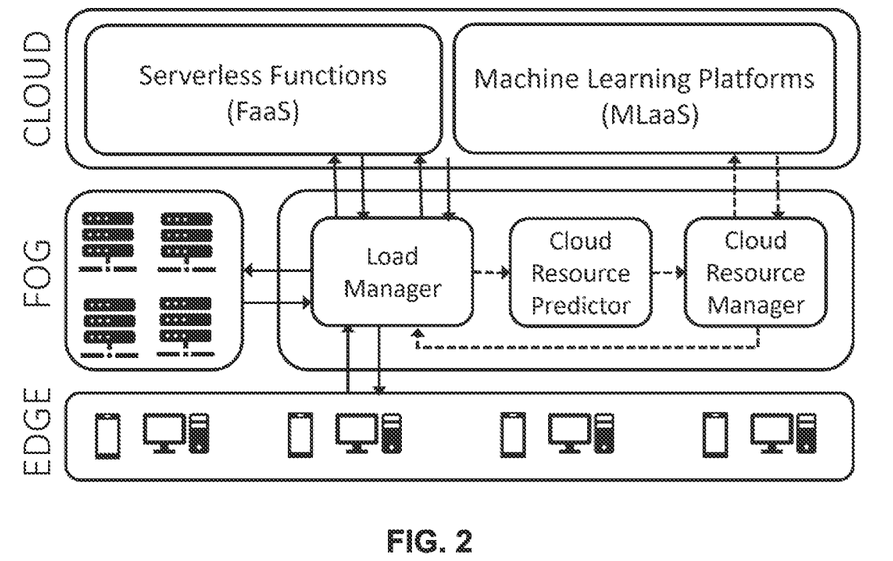
FIG. 2 depicts an exemplary high level block diagram of the system of FIG. 1 for service-level objective (SLO) aware execution of concurrence inference requests on a fog-cloud network, in accordance with an embodiment of the present disclosure.

FIG. 2, with reference to FIG. 1, depicts an exemplary high level block diagram of the system 100 of FIG. 1 for service-level objective (SLO) aware execution of concurrence inference requests on a fog-cloud network, in accordance with an embodiment of the present disclosure.

Figure 3:
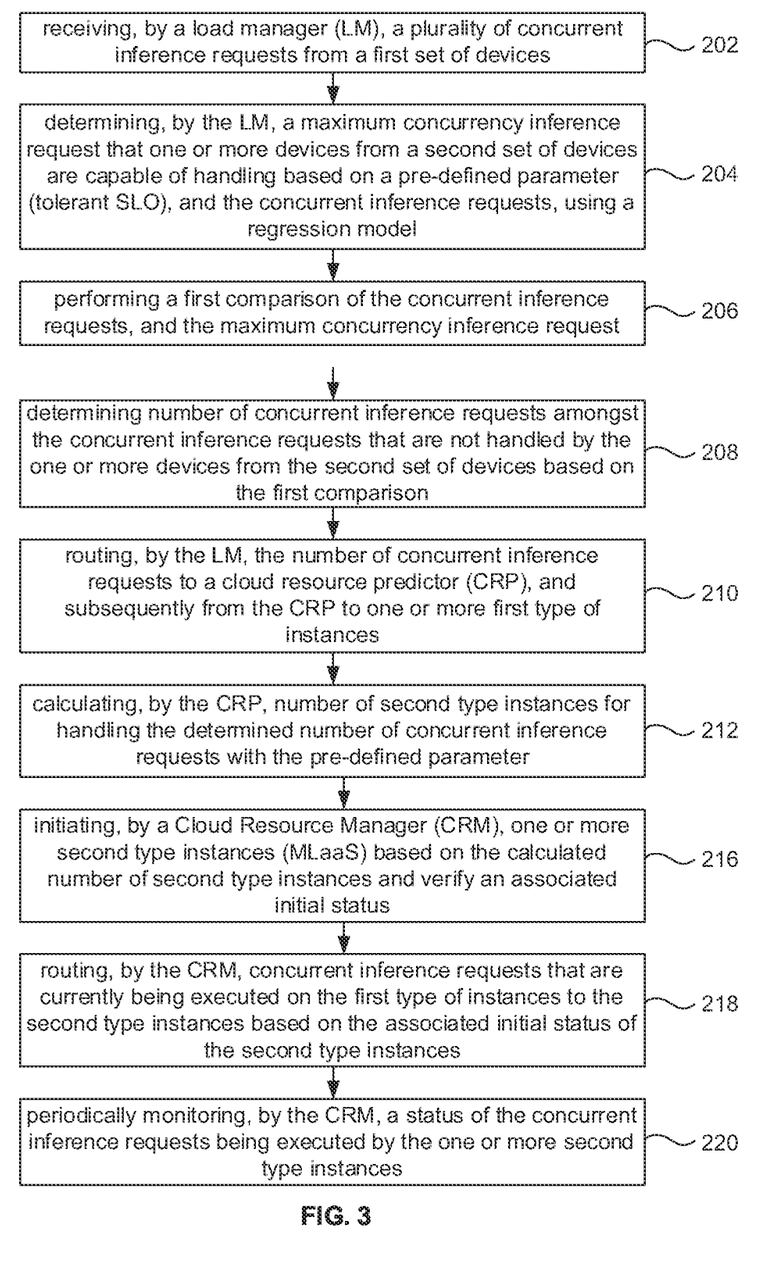
FIG. 3 depicts an exemplary flow chart illustrating a method for service-level objective (SLO) aware execution of concurrence inference requests on a fog-cloud network, using the systems of FIGS. 1-2, in accordance with an embodiment of the present disclosure.

FIG. 3, with reference to FIGS. 1-2, depicts an exemplary flow chart illustrating a method for service-level objective (SLO) aware execution of concurrence inference requests on a fog-cloud network, using the systems of FIGS. 1-2, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the block diagram of the system 100 depicted in FIG. 2, and the flow diagram as depicted in FIG. 3.

At step 202 of the method of the present disclosure, the one or more hardware processors 104 receive, by using a load manager (LM), a plurality of concurrent inference requests from a first set of devices. The expression 'concurrent inference requests' may also be referred as 'concurrent requests' and interchangeably used herein. The first set of devices are a set of edge devices and may also be referred as devices of edge users and interchangeably used herein, in an embodiment of the present disclosure. Concurrent requests from edge users are accepted/received by the load manager (LM).

At step 204 of the method of the present disclosure, the one or more hardware processors 104 determine, by using the LM, a maximum concurrency inference request(s) that one or more devices from a second set of devices are capable of handling based on a pre-defined parameter, and the plurality of concurrent inference requests, using a regression model. In other words, the LM/the one or more hardware processors invokes and executes the regression model (e.g., a statistical technique as known in the art) for determining the maximum concurrency inference request(s) that one or more devices from the second set of devices are capable of handling/executing the concurrency inference request(s). This maximum concurrency inference request(s) is based on (i) the pre-defined parameter (e.g., x % tolerant service-level objective (SLO) breach/violation/tolerant) and (ii) the plurality of concurrent inference requests. For instance, value of 'x' is a real number, say 5, wherein the pre-defined parameter is 5%. It is to be understood by a person having ordinary skill in the art or person skilled in the art that such example of the pre-defined parameter (or the tolerant SLO breach/violation/) shall not be construed as limiting the scope of the present disclosure. In other words, the parameter value/tolerant SLO depending upon the requirements and deployed/deployable infrastructures/environments. The one or more devices amongst the second set of devices and/or the second set of devices are fog devices, in an embodiment of the present disclosure.

At step 206 of the method of the present disclosure, the one or more hardware processors 104 perform a first comparison of (i) the plurality of concurrent inference requests, and (ii) the maximum concurrency inference request.

At step 208 of the method of the present disclosure, the one or more hardware processors 104 determine number of concurrent inference requests amongst the plurality of concurrent inference requests that are not handled by the one or more devices from the second set of devices based on the first comparison.

At step 210 of the method of the present disclosure, the one or more hardware processors 104 or the LM route the number of concurrent inference requests amongst the plurality of concurrent inference requests to a cloud resource predictor (CRP), and subsequently from the CRP to one or more first type of instances.

The steps 206 through 210 are better understood by way of following description. The number of concurrent inference requests that are not handled by or not serviced by the fog devices are determined by (i) the plurality of concurrent inference requests, and (ii) the maximum concurrency inference request. As described above, the maximum concurrent request that the fog devices may/can handle with less than 5% SLO breaches for a given SLO is determined using the regression model. The identified volume of incoming request traffic is routed to the one or more fog devices for processing by the LM. If the concurrency of the incoming inference requests is higher, the remaining requests are routed from the CRP to one or more first type of instances. The one or more first type of instances are one or more Function as a Service (FaaS) instances.

At step 212 of the method of the present disclosure, the one or more hardware processors 104 or the CRP calculate number of second type instances for handling the determined number of concurrent inference requests with the pre-defined parameter. The second type instances are one or more Machine Learning as a Service (MLaaS) instances, in an embodiment of the present disclosure.

At step 214 of the method of the present disclosure, the one or more hardware processors 104 or a Cloud Resource Manager (CRM), initiate one or more second type instances based on the calculated number of second type instances and verify an associated initial status. The associated initial status is a boot status. In other words, the boot status is continually monitored by the CRM to determine whether the one or more second type instances are up (or booted) for operations/running as per the requirement.

At step 216 of the method of the present disclosure, the one or more hardware processors 104 or the CRM route one or more concurrent inference requests from the number of concurrent inference requests that are currently being executed on the one or more first type of instances (FaaS) to the one or more second type instances (MLaaS) once the one or more second type instances are booted and ready for handling the one or more concurrent inference requests.

At step 218 of the method of the present disclosure, the one or more hardware processors 104 or the CRM periodically monitor a status of the one or more concurrent inference requests being executed by the one or more second type instances. For instance, the status may include, but are not limited to, a completion status, a work in progress status, an incomplete status, an abandon status, an idle status, and the like. Based on the status acquired by the one or more second type instances (MLaaS), the CRM/one or more hardware processors 104 take appropriate actions. For example, the CRM or the one or more hardware processors 104 turn OFF at least a subset of the one or more second type instances based on a second comparison of an associated idle time with a pre-defined time For instance, a second type instance say MLaaS 'A' would have completed servicing its respective concurrent inference request(s) and is currently in idle status. If the idle status of the MLaaS 'A' is greater than or equal to the pre-defined time, then the CRM or the one or more hardware processors 104 turn OFF the MLaaS 'A' thus optimizing the utilization. For instance, say MLaaS 'A' has completed servicing its concurrence inference request and the system 100 has flagged completion status and the idle time attained by the MLaaS posting completing the concurrence inference request is x seconds (e.g., say 5 seconds). If the pre-defined time (e.g., pre-defined idle time) is say 4 seconds, then the system 100 or the CRM turns OFF the MLaaS. If the idle time attained by the MLaaS posting completing the concurrence inference request is 'p' seconds (e.g., say p=3 seconds). If the pre-defined time (e.g., pre-defined idle time) is say 4 seconds, then the system 100 or the CRM may either (i) assign another concurrent inference request for servicing, or (ii) wait for the idle time to reach the pre-defined idle time to turn OFF or (ii) may still turning OFF the MLaaS, in an embodiment of the present disclosure.

The above steps of 212 through 218 and turning OFF of the second type of instances are better understood by way of the following description: The concurrent inference requests sent to the cloud resource manager are executed using the first type instances and/or the second type of instances (e.g., FaaS and MLaaS instances). The system migrates all requests (e.g., concurrent inference requests) to MLaaS if enough instances are available for inference without SLO violations. Otherwise, the load is balanced between available FaaS and MLaaS instances. In such a case, the LM sends the number of requests served by FaaS to CRP. When the LM receives an affirmative signal from the CRP, all FaaS inference requests are transferred to MLaaS. The regression model at CRP uses the number of requests to be executed on cloud resources as input from the LM to determine the number of second type instances (e.g., MLaaS instances) required to cater to the cloud intended inference requests with less than 5% SLO violations.

The CRM starts additional MLaaS instances which are requested by the CRP to manage the volume of incoming inference requests. Additionally, the CRM continuously tracks the load and state of each running MLaaS instance for minimizing SLO violations. CRM scales up and scales down MLaaS instances based on workload demand for cost-efficient execution without SLO violation.

Figure 4A:
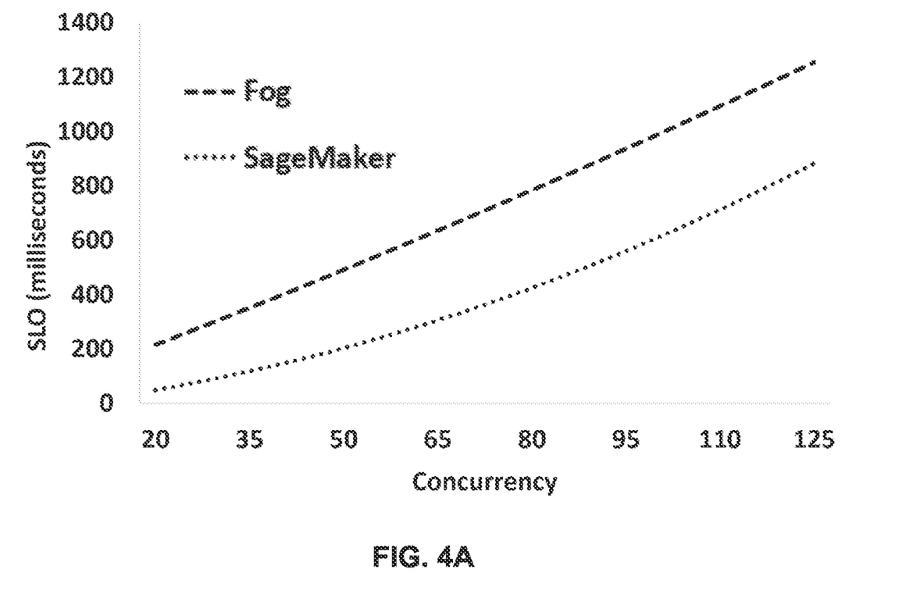
FIG. 4A depicts values of T5% (also referred as Tolerant SLO) obtained on a fog device and a Machine Learning as a Service (MLaaS) instance for a HealthFog application plotted against rising concurrency, in accordance with an embodiment of the present disclosure.
Figure 4B:
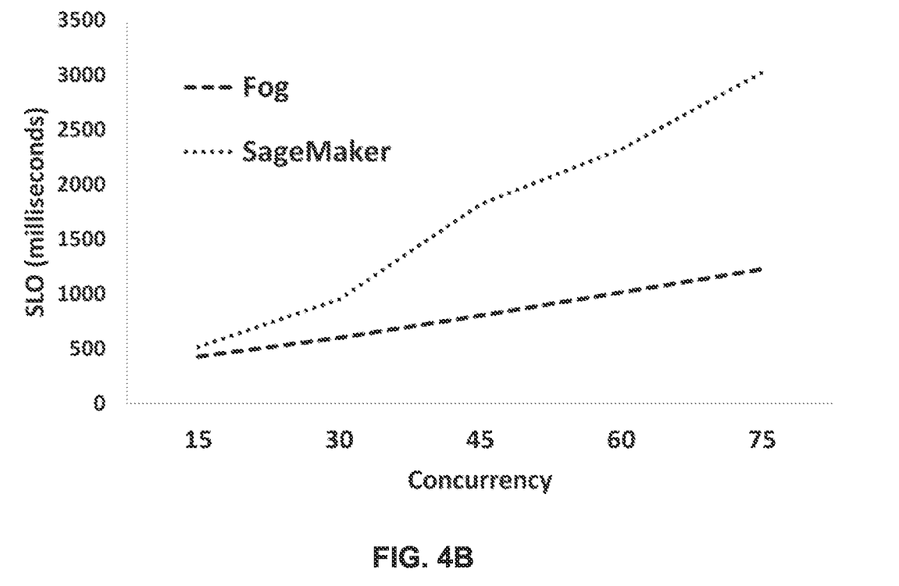
FIG. 4B depicts values of T5% obtained on a fog device and a Machine Learning as a Service (MLaaS) instance for a Normalized Item and Session Representations (NISER) application plotted against rising concurrency, in accordance with an embodiment of the present disclosure.

In order to achieve the above implementation and load balancing, firstly, the capacity of the fog device and a single second type instance (e.g., MLaaS instance) to be used were calculated by the system 100. Experiments were conducted with varied concurrency while the inference requests were made to the resource for a predetermined amount of time with a constant arrival rate. The system 100 observed the minimum latency that can be supported by less than 'x %' (e.g., 5% SLO violation for a given concurrency. In other words, a 5% tolerant SLO number ($T_5$%) for each of the concurrencies has been obtained. FIG. 4A, with reference to FIGS. 1 through 3, depicts values of $T_5$% (also referred as Tolerant SLO) obtained on a fog device and a Machine Learning as a Service (MLaaS) instance for a HealthFog application plotted against rising concurrency, in accordance with an embodiment of the present disclosure. Similarly, NISER application observations are shown in FIG. 4B. More specifically, FIG. 4B, with reference to FIGS. 1 through 4A, depicts values of $T_5$% obtained on a fog device and a Machine Learning as a Service (MLaaS) instance for a Normalized Item and Session Representations (NISER) application plotted against rising concurrency, in accordance with an embodiment of the present disclosure.

Using curve fitting technique, 2nd degree polynomial regression equation (1) is derived from the data points of SLO violations shown in FIGS. 4A and 4B. The optimal concurrency ($C_p$) that adheres to the specified SLO with less than 5% infractions are determined by the equation (1) as shown below:

$$C_P = \alpha + SLO^2 + \beta \times SLO + \gamma \qquad (1)$$

The value of constants α, β, and γ is based on the nature of application as well as the underlying hardware. Table 1 and 2 give the values of these constants for LM and CRP model of the NISER and HealthFog applications respectively

TABLE 1

| Instance | α | β | γ |
| --- | --- | --- | --- |
| Fog | −0.0000119098 | 0.0943862295 | −23.202762178 |
| SageMaker | −0.0000003598 | 0.0245515777 | 3.9263076451 |

TABLE 2

| Instance | α | β | γ |
| --- | --- | --- | --- |
| Fog | −0.0000100931 | 0.1157314712 | −4.338963016 |
| SageMaker | −0.0000725881 | 0.1904910006 | 2.7724733681 |

The constants obtained for the fog device are used in the above equation (1) along with required SLO to get optimal concurrency ($C_p$) for fog device managed LM. In case, incoming concurrency is greater than ($C_p$) at the fog device, then the remaining concurrency is directed to MLaaS managed by CRP. There is two-step calculation at CRP. First, the constants obtained for the MLaaS instance are used by equation (1) to get optimal concurrency ($C_p$) to be executed on one instance. Second, the total number of MLaaS instances is calculated by dividing the incoming concurrency at CRP by $C_p$ calculated at CRP.

The efficiency of the system 100 of FIGS. 1 and 2 is demonstrated by two case studies from two different domains, one from the health domain and the other from recommendations and same are illustrated below:

HealthFog: To provide healthcare as a fog service, the HealthFog (e.g., refer "S. Tuli, N. Basumatary, S. S. Gill, M. Kahani, R. C. Arya, G. S. Wander and R. Buyya, "HealthFog: An ensemble deep learning based Smart Healthcare System for Automatic Diagnosis of Heart Diseases in integrated IoT and fog computing environments," Future Generation Computer Systems, Volume 104, 2020, pp. 187-200, doi: doi.org/10.1016/j.future.2019.10.043.") framework integrates ensemble deep learning in edge computing devices and successfully manage the data of the heart patients arriving from various IoT sensors or devices. Since HealthFog employs multiple technologies including machine learning (ML)/deep learning (DL), Internet of Things (IoT), and the Edge-Fog-Cloud paradigm, hence it is the best use case for validating the system 100 of FIGS. 1 and 2. HealthFog uses edge-fog and Infrastructure as a Service (IaaS) on a cloud to construct the optimum framework for network bandwidth, DL model prediction accuracy, and power usage. The use of system 100 for HealthFog is a natural extension as it provides the use of multiple cloud platforms for SLO aware and cost-effective deployment.

NISER: Normalized Item and Session Representations (NISER) (e.g., refer "P. Gupta, D. Garg, P. Malhotra, L. Vig and G. M. Shroff, "NISER: normalized item and session representations with graph neural networks," 1st International Workshop on Graph Representation Learning and its Applications, 2019, doi:https://doi.org/10.48550/arXiv.1909.04276") is a session-based recommendation (SR) model. NISER model consists of several layers of neurons (including the GNN layer (e.g., refer "Y. Li, D. Tarlow, M. Brockschmidt and R. Zemel, "Gated graph sequence neural networks, "arXiv preprint arXiv:1511.05493, 2015, doi: https://doi.org/10.48550/arXiv.1511.05493")). NISER makes use of the most recent activities of a user to make recommendations. NISER is suitable in scenarios where recommendations are made for unknown users with no prior purchase history. For instance, new users exploring products on an e-commerce website (or a non-logged-in user). In both offline and online contexts, NISER has enhanced ability to deal with popularity bias in comparison to standard GNN model. Again, NISER is a good use case for the system 100 where maintaining low latency is challenging in a dynamically varying workload due to the unpredictable number of users during a day, week, month, or year.

Experimental Setup

The system 100 has been validated using two applications as mentioned above. Cloud resource configurations used for both the applications are shown in Table 3. A two-core bare metal single machine is used as a fog device for both the applications.

TABLE 3

| | | Value | |
|---|---|---|---|
| | Instance property Name | HealthFog ml.c5.large | NISER ml.m4.xlarge |
| SageMaker | vCPU | 2 | 4 |
| | Memory (GiB) | 4 | 16 |
| | Memory (MB) | 512 | 3072 |
| Lambda | Ephemeral Storage (MB) | 1024 | 5120 |

The system 100 was configured with an Edge-Fog-Cloud framework with the system 100 positioned between them as shown FIG. 2. The network overhead for each connecting link of Edge-Fog-Cloud framework is shown in Table 3. JMeter (e.g., "JMeter, https://jmeter.apache.org/, 2022") was used to generate the inference requests and these were fed to the system 100 of FIGS. 1 and 2 in order to simulate multiple edge devices concurrently. JMeter generated the inference requests by altering concurrency at predetermined intervals, doing so for 60 minutes at a constant arrival rate. As described above, the system 100 receives these inference requests and load balanced them up between fog, SageMaker, and Lambda functions. Depending on the nature of application, the system 100 considered 100 ms SLO for HealthFog and 500 ms SLO for NISER for experiments.

TABLE 4

| | Network delay (ms) | |
|---|---|---|
| Network link | HealthFog | NISER |
| Edge-System 100 of FIG. 1 and 2 | 0 | 0 |
| System 100 of FIG. 1 and 2-FOG | 0 | 0 |
| System 100 of FIG. 1 and 2-Lambda | 53 | 58 |
| System 100 of FIG. 1 and 2-SageMaker | 53 | 61 |

In the experiments conducted by the present disclosure, the system, the system, and method spawned one fog device, one SageMaker instance and multiple serverless instances. However, the framework can be extended for multiple fog and SageMaker instances and such spawning shall not be construed as limiting the scope of the present disclosure.

The cost of SageMaker instance usage has been derived from number of instances, time duration for which the instances were in the running state, and the amount of data received and sent. Also, the price for each Lambda function was calculated using executing time of a function, frequency of function execution, memory allocated, and price per GBs. A detailed Lambda cost model is available in research work (e.g., refer "D. Chahal, S. C. Palepu and R. Singhal, "A Scalable and Cost-effective ServerlessArchitecture for Information Extraction Workflows," HiPS '22: Proceedings of the 2nd Workshop on High Performance Serverless Computing, June 2022, pp. 15-23, doi:https://doi.org/10.1145/3526060.3535458").

Experimental Analysis

The present disclosure discusses the experimental analysis of the system 100 and its method using HealthFog and NISER as a use case.

Cost and Latency Comparison

Figure 5:
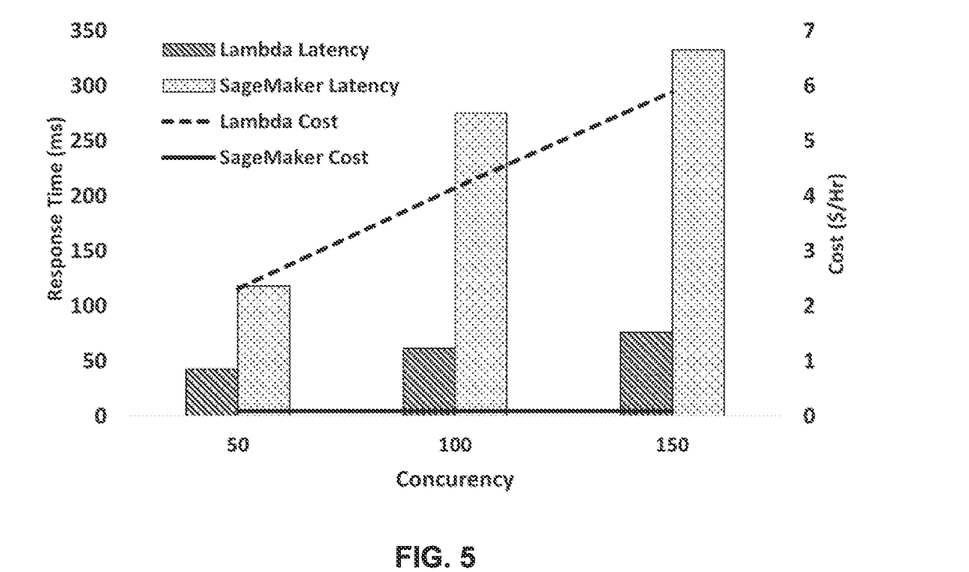
FIG. 5 illustrates a graphical representation of latency and cost comparison for Lambda (FaaS) and SageMaker (MLaaS), in accordance with an embodiment of the present disclosure.

The experiments were conducted to assess the expenses incurred and latency provided by the two deployments previously discussed. In this experiment, incoming inference requests were fed to both installations at a constant pace for an hour. The experiment has been repeated three times with varying arrival rates, i.e., concurrency. The lambda functions tend to be expensive in the case of a greater arrival rate, and their cost rises with a rising arrival rate, as can be seen from FIG. 5. SageMaker, on the other hand, has a fixed cost because it is not billed based on how many requests it fulfills. On the other hand, SageMaker's response time has lengthened when the arrival rate rises. As an alternative, lambda offered nearly constant latency regardless of the rate at which requests arrive. It is not practical to supply SageMaker instances for peak arrival rates as it results in a large percentage of SLO violations. The goal is to have least SLO violations coupled with little cost paid. However, consistent use of the lambda service raises the cost required. FIG. 5, with reference to FIGS. 1 through 4B, illustrates a graphical representation of latency and cost comparison for Lambda (FaaS) and SageMaker (MLaaS), in accordance with an embodiment of the present disclosure.

Figure 6:
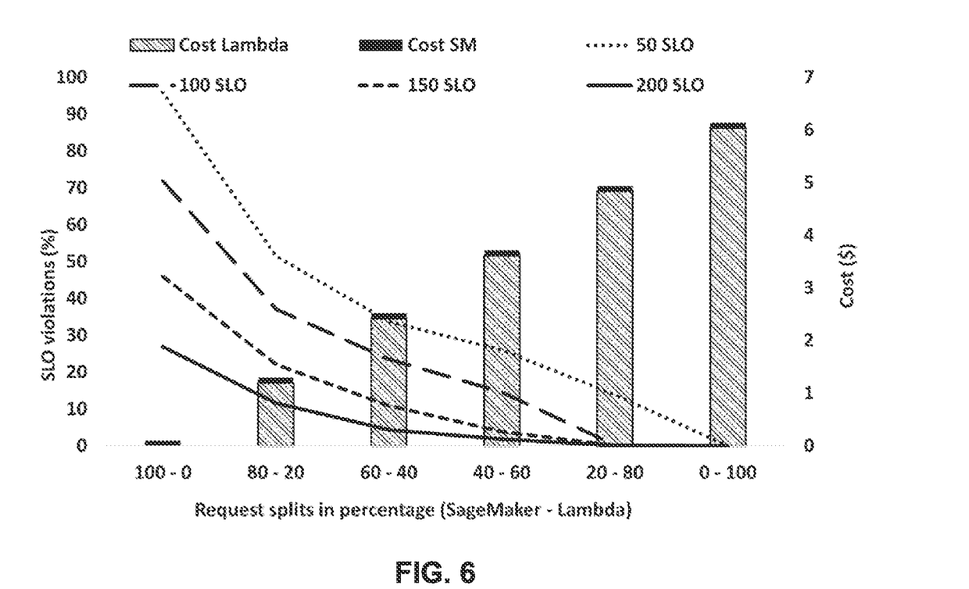
FIG. 6 depicts a graphical representation illustrating cost and service-level objective (SLO) violation for SageMaker and Lambda as MLaaS and FaaS respectively, in accordance with an embodiment of the present disclosure.

According to the findings of the above experiment, both deployments are found to be necessary for a balanced system. Working together, MLaaS and FaaS can create a reasonable balance between cost and latency. Another experiment was undertaken to comprehend how well the inference system (e.g., the system 100) performed when MLaaS and FaaS were combined with changing weights. In this experiment, the system 100 was fed with a continual stream of concurrent inference requests, which were then forked to SageMaker and Lambda. The cost and SLO violations were calculated for increasing Lambda and decreasing SageMaker's share in the mix of SageMaker and Lambda. According to FIG. 6, the cost tends to be relatively low, but the rate of SLO violations for each SLO constraint is maximum when all requests were routed to SageMaker. On the other hand, there were hardly any SLO violations when all requests were forwarded to Lambda, but the cost has been enormous. The cost grows proportionally as the percentage of requests handled by Lambda rises, although SLO violations fall along with it. Another finding was that the cost of SageMaker remains constant for all potential combinations. FIG. 6, with reference to FIGS. 1 through 5, depicts a graphical representation illustrating cost and service-level objective (SLO) violation for SageMaker and Lambda as MLaaS and FaaS respectively, in accordance with an embodiment of the present disclosure.

Figure 7:
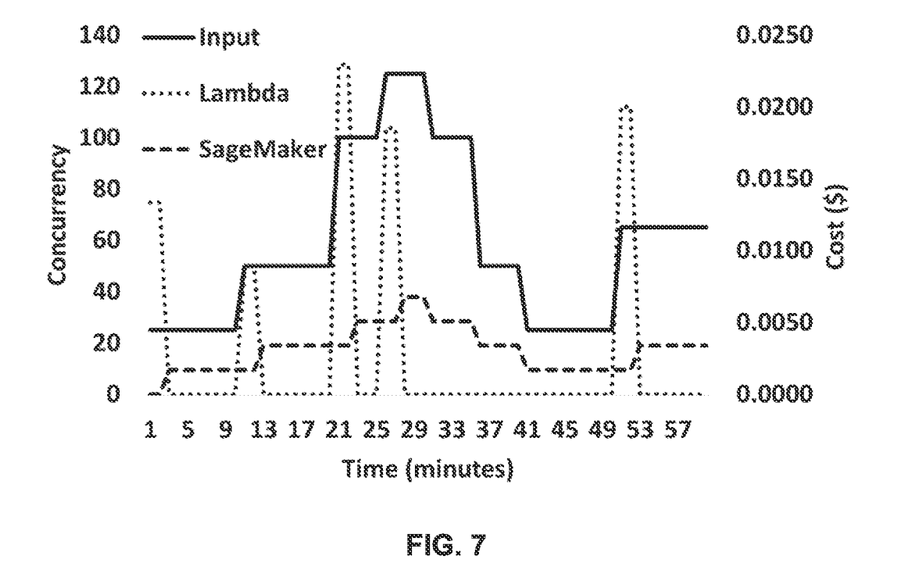
FIG. 7 depicts a graphical representation illustrating a comparison between cost variation versus input pattern arrival, for HealthFog application, in accordance with an embodiment of the present disclosure.
Figure 8:
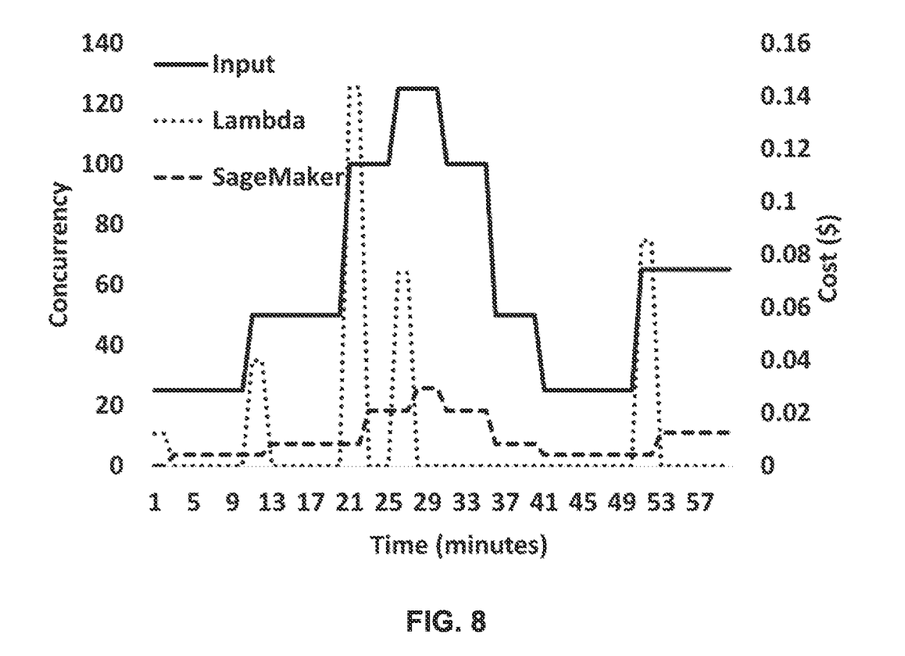
FIG. 8 depicts a graphical representation illustrating a comparison between cost variation versus input pattern arrival, for a Normalized Item and Session Representations (NISER) application, in accordance with an embodiment of the present disclosure.

As described above, the system 100 of FIGS. 1 and 2 balances the pre-calculated load on each computing instance ensuring SLO violations do not breach the 5% mark. The cost analysis of cloud resources for both applications is described/illustrated below. The cost is calculated for both applications for a 1-hour duration. FIG. 7, with reference to FIGS. 1 through 6, depicts a graphical representation illustrating a comparison between cost variation versus input pattern arrival, for HealthFog application, in accordance with an embodiment of the present disclosure. FIG. 8, with reference to FIGS. 1 through 7, depicts a graphical representation illustrating a comparison between cost variation versus input pattern arrival, for NISER application, in accordance with an embodiment of the present disclosure. More specifically, FIGS. 7 and 8 show the cost in different slots of total 1-hour duration for HealthFog and NISER workloads.

FIG. 7 illustrates the changes in costs brought on by variations in the concurrent input inference load for the HealthFog application, whereas FIG. 8 demonstrates for NISER. Whenever concurrency rises above the maximum allowed in the fog instance without SLO violation, the system 100 splits the additional incoming load into two segments. First, it exhausted the capacity of the already running MLaaS (SageMaker in this case) instances. If there were still inference requests more than allowed on SageMaker instances, all such requests are routed to the Lambda instances for execution without SLO violations. However, additional SageMaker instances are initialized. As a result of this setup, all running SageMaker instances have been optimally utilized, and the minimum required load was executed on Lambda. However, for every increase in the input load, Lambda cost tends to increase. Once initialized SageMaker instances were up and available for execution, the load going to Lambda was transferred back to the new SageMaker instance. As a consequence, whenever the Lambda load drops, there has been a gain in SageMaker's cost which corresponds to an increasing number of SageMaker instances. Additionally, when the concurrency of input load decreases, Lambda played no role and the cost of SageMaker decreased as SageMaker instances were scaled down. This proactive nature of the system 100 avoids under-utilization of SageMaker instances and over-utilization of Lambda services. Maximum load on SageMaker and minimum on Lambda helps to reduce functioning cost and SLO violations.

Embodiments of the present disclosure provide system and method for inference request management that cost-effectively uses FaaS and MLaaS cloud platforms/instances while limiting SLO violations. The system 100 is observed to be an efficient system for the fog-cloud paradigm as it optimizes the execution of inference requests on fog, MLaaS, and FaaS instances by taking SLO and computing capacity into account (refer FIGS. 4 through 8). The system 100 efficiently balances the load between fog, MLaaS, and FaaS instances by estimating the number of instances using empirical models. The present disclosure used two applications namely HealthFog and NISER to test the effectiveness of the system 100 and the method. In both cases, the system 100 and the method efficiently served the concurrent inference requests cost-effectively using fog and cloud services (e.g., FaaS/MLaaS) by keeping SLO violations within the limits. Further, the system 100 performs turning ON (initiating) and OFF the MLaaS instances based on the incoming inference requests being routed from fog devices (e.g., the second set of devices) to cloud (e.g., FaaS), and then, the system further routes these from FaaS to MLaaS. Such turning ON and OFF of the MLaaS and continually or periodic monitoring enables the system 100 to utilize the available resources effectively and optimally, thereby ensuring lesser cost being incurred through the entire infrastructure.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
receiving, by a load manager (LM) via one or more hardware processors, a plurality of concurrent inference requests from a first set of devices;
determining, by the LM via the one or more hardware processors, a maximum concurrency inference request that one or more devices from a second set of devices are capable of handling based on a pre-defined parameter, and the plurality of concurrent inference requests, using a regression model;
performing, via the one or more hardware processors, a first comparison of (i) the plurality of concurrent inference requests, and (ii) the maximum concurrency inference request;
determining, via the one or more hardware processors, a number of concurrent inference requests amongst the plurality of concurrent inference requests that are not handled by the one or more devices from the second set of devices based on the first comparison;
routing, by the LM via the one or more hardware processors, the number of concurrent inference requests amongst the plurality of concurrent inference requests to a cloud resource predictor (CRP), and subsequently from the CRP to one or more first type of instances;
calculating, by the CRP via the one or more hardware processors, a number of second type instances for handling the determined number of concurrent inference requests with the pre-defined parameter;
initiating, by a Cloud Resource Manager (CRM) via the one or more hardware processors, one or more second type instances based on the calculated number of second type instances and verifying an associated initial status;
routing, by the CRM via the one or more hardware processors, one or more concurrent inference requests from the number of concurrent inference requests that are currently being executed on the one or more first type of instances to the one or more second type instances based on the associated initial status of the one or more second type instances; and
periodically monitoring, by the CRM via the one or more hardware processors, a status of the one or more concurrent inference requests being executed by the one or more second type instances.

2. The processor implemented method of claim 1, further comprising turning OFF, by the CRM via the one or more hardware processors, at least a subset of the one or more second type instances based on a second comparison of an associated idle time with a pre-defined time.

3. The processor implemented method of claim 1, wherein the first set of devices comprises one or more edge devices, and wherein the second set of devices comprises one or more fog devices.

4. The processor implemented method of claim 1, wherein when the plurality of concurrent inference requests is greater than the maximum concurrency inference request, the one or more concurrent inference requests are routed to at least one of the one or more first type of instances and the one or more second type of instances.

5. The processor implemented method of claim 1, wherein the one or more first type of instances comprise a Function as a Service (FaaS) instance.

6. The processor implemented method of claim 1, wherein the one or more second type instances comprise a Machine Learning as a Service (MLaaS) instance.

7. The processor implemented method of claim 1, wherein the one or more first type instances and the one or more second type instances are run on a cloud network.

8. A system, comprising:
a memory storing instructions;
one or more communication interfaces; and
one or more hardware processors coupled to the memory via the one or more communication interfaces (106), wherein the one or more hardware processors are configured by the instructions to:
receive, by using a load manager (LM), a plurality of concurrent inference requests from a first set of devices;
determine, by using the LM, a maximum concurrency inference request that one or more devices from a second set of devices are capable of handling based on a pre-defined parameter, and the plurality of concurrent inference requests, using a regression model;
perform a first comparison of (i) the plurality of concurrent inference requests, and (ii) the maximum concurrency inference request;
determine a number of concurrent inference requests amongst the plurality of concurrent inference requests that are not handled by the one or more devices from the second set of devices based on the first comparison;
route, by using the LM, the number of concurrent inference requests amongst the plurality of concurrent inference requests to a cloud resource predictor (CRP), and subsequently from the CRP to one or more first type of instances;
calculate, by using the CRP, a number of second type instances for handling the determined number of concurrent inference requests with the pre-defined parameter;
initiate, by using a Cloud Resource Manager (CRM), one or more second type instances based on the calculated number of second type instances and verify an associated initial status;
route, by using the CRM, one or more concurrent inference requests from the number of concurrent inference requests that are currently being executed on the one or more first type of instances to the one or more second type instances based on the associated initial status of the one or more second type instances; and
periodically monitor, by using the CRM via the one or more hardware processors, a status of the one or more concurrent inference requests being executed by the one or more second type instances.

9. The system of claim 8, wherein the one or more hardware processors are further configured by the instructions to turning OFF, by using the CRM, at least a subset of the one or more second type instances based on a second comparison of an associated idle time with a pre-defined time.

10. The system of claim 8, wherein the first set of devices comprises one or more edge devices, and wherein the second set of devices comprises one or more fog devices.

11. The system of claim 8, wherein when the plurality of concurrent inference requests is greater than the maximum concurrency inference request, the one or more concurrent inference requests are routed to at least one of the one or more first type of instances and the one or more second type of instances.

12. The system of claim 8, wherein the one or more first type of instances comprise a Function as a Service (FaaS) instance.

13. The system of claim 8, wherein the one or more second type instances comprise a Machine Learning as a Service (MLaaS) instance.

14. The system of claim 8, wherein the one or more first type instances and the one or more second type instances are run on a cloud network.

15. One or more non-transitory machine-readable information storage mediums comprising one or more instructions which when executed by one or more hardware processors cause:
receiving, by a load manager (LM) a plurality of concurrent inference requests from a first set of devices;
determining, by the LM, a maximum concurrency inference request that one or more devices from a second set of devices are capable of handling based on a pre-defined parameter, and the plurality of concurrent inference requests, using a regression model;
performing a first comparison of (i) the plurality of concurrent inference requests, and (ii) the maximum concurrency inference request;
determining a number of concurrent inference requests amongst the plurality of concurrent inference requests that are not handled by the one or more devices from the second set of devices based on the first comparison;
routing, by the LM, the number of concurrent inference requests amongst the plurality of concurrent inference requests to a cloud resource predictor (CRP), and subsequently from the CRP to one or more first type of instances;
calculating, by the CRP, a number of second type instances for handling the determined number of concurrent inference requests with the pre-defined parameter;
initiating, by a Cloud Resource Manager (CRM), one or more second type instances based on the calculated number of second type instances and verifying an associated initial status;
routing, by the CRM, one or more concurrent inference requests from the number of concurrent inference requests that are currently being executed on the one or more first type of instances to the one or more second type instances based on the associated initial status of the one or more second type instances; and
periodically monitoring, by the CRM, a status of the one or more concurrent inference requests being executed by the one or more second type instances.

16. The one or more non-transitory machine-readable information storage mediums of claim 15, wherein the one or more instructions which when executed by the one or more hardware processors further cause turning OFF, by the CRM, at least a subset of the one or more second type instances based on a second comparison of an associated idle time with a pre-defined time.

17. The one or more non-transitory machine-readable information storage mediums of claim 15, wherein the first set of devices comprises one or more edge devices, and wherein the second set of devices comprises one or more fog devices.

18. The one or more non-transitory machine-readable information storage mediums of claim 15, wherein when the plurality of concurrent inference requests is greater than the maximum concurrency inference request, the one or more concurrent inference requests are routed to at least one of the one or more first type of instances and the one or more second type of instances.

19. The one or more non-transitory machine-readable information storage mediums of claim 15, wherein the one or more first type of instances comprise a Function as a Service (FaaS) instance.

20. The one or more non-transitory machine-readable information storage mediums of claim 15, wherein the one or more second type instances comprise a Machine Learning as a Service (MLaaS) instance, and wherein the one or more first type instances and the one or more second type instances are run on a cloud network.

\* \* \* \* \*